Sept. 9, 1958 W. F. DE FOA 2,851,200
SPREADER WITH HINGED HOPPER AND REMOVABLE AGITATOR
Filed Feb. 20, 1956 4 Sheets-Sheet 2
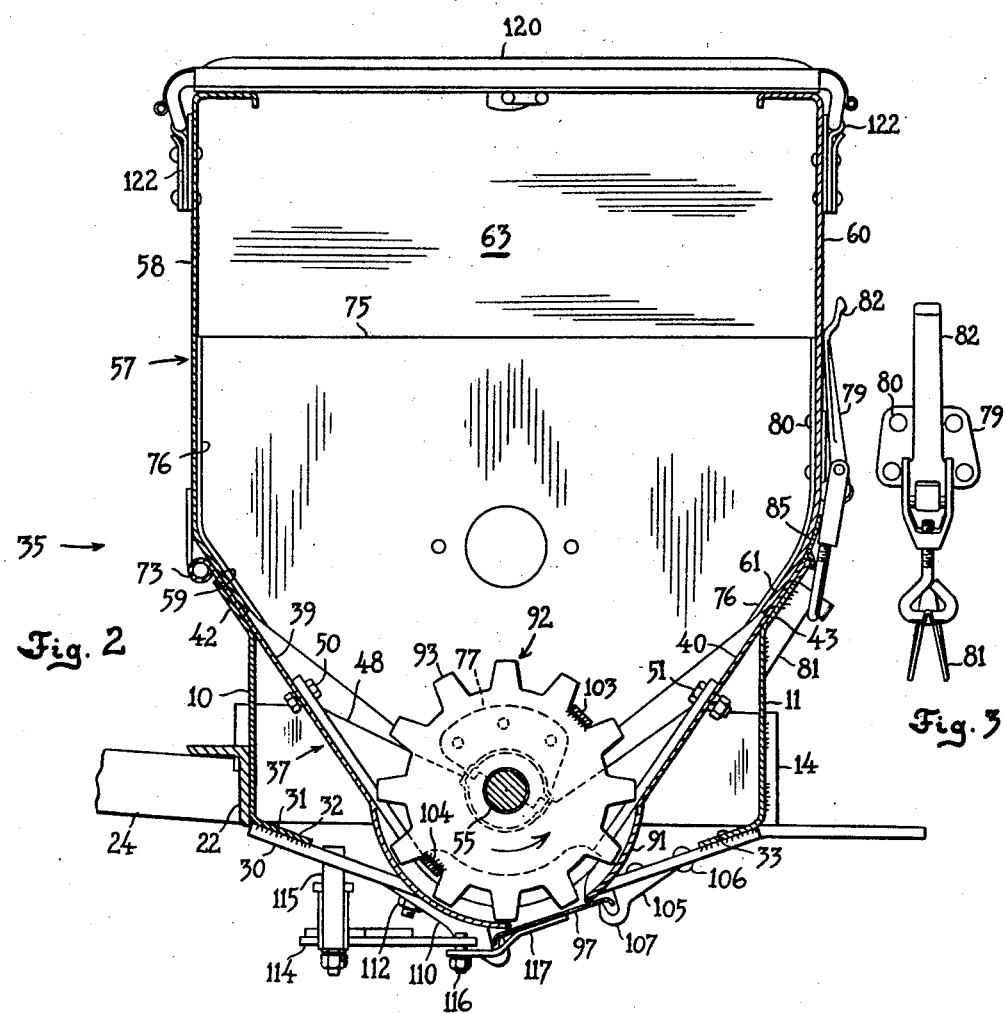
INVENTOR:
Walter F. De Foa
by James E. Nilles
Attorney Sept. 9, 1958 W. F. DE FOA 2,851,200
SPREADER WITH HINGED HOPPER AND REMOVABLE AGITATOR
Filed Feb. 20, 1956 4 Sheets-Sheet 3
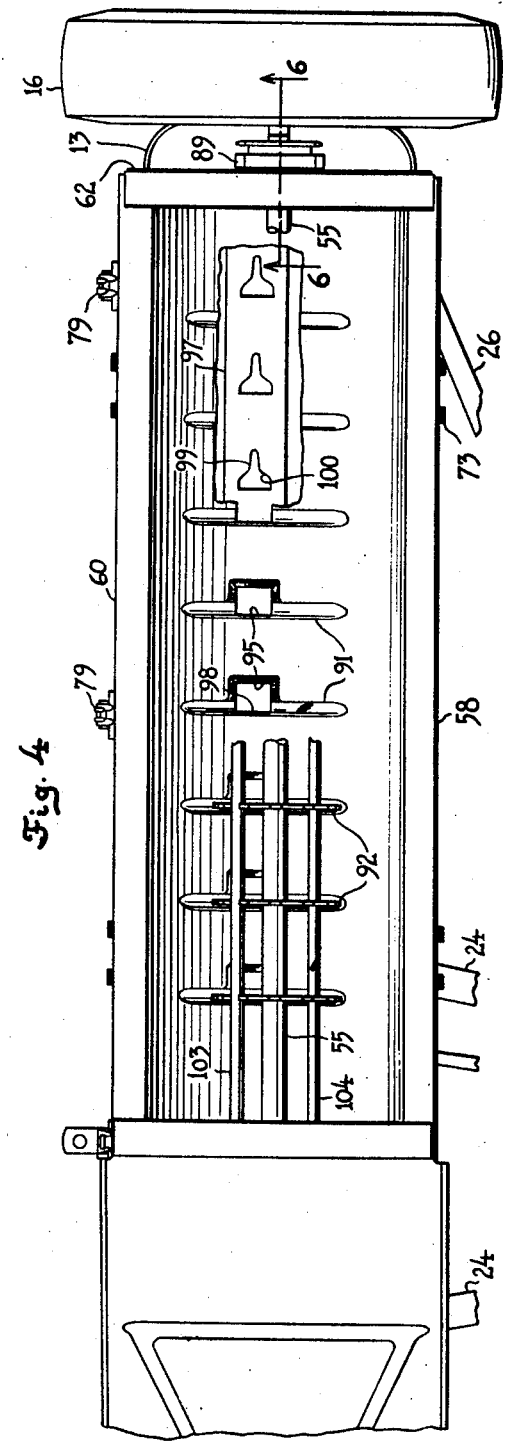
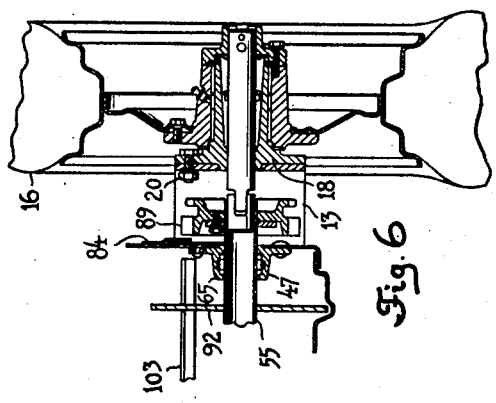
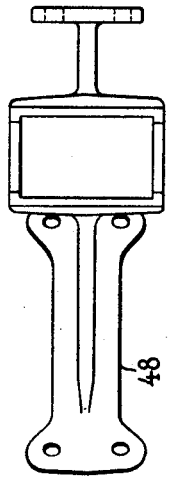
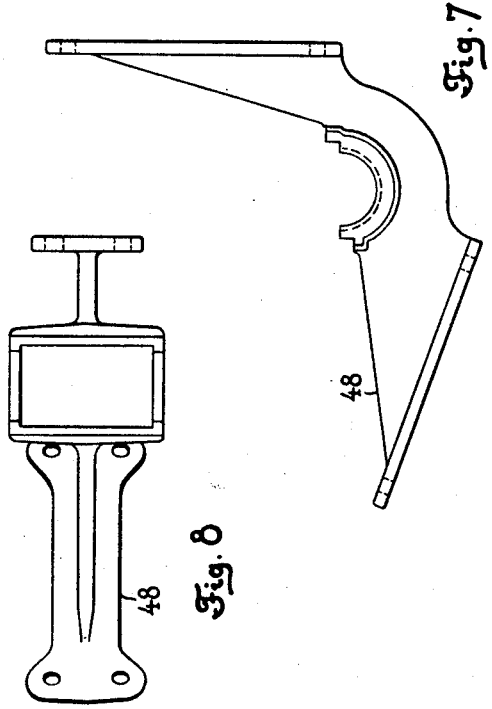
INVENTOR:
Walter F. De Foa
by James E. Nilles
Attorney

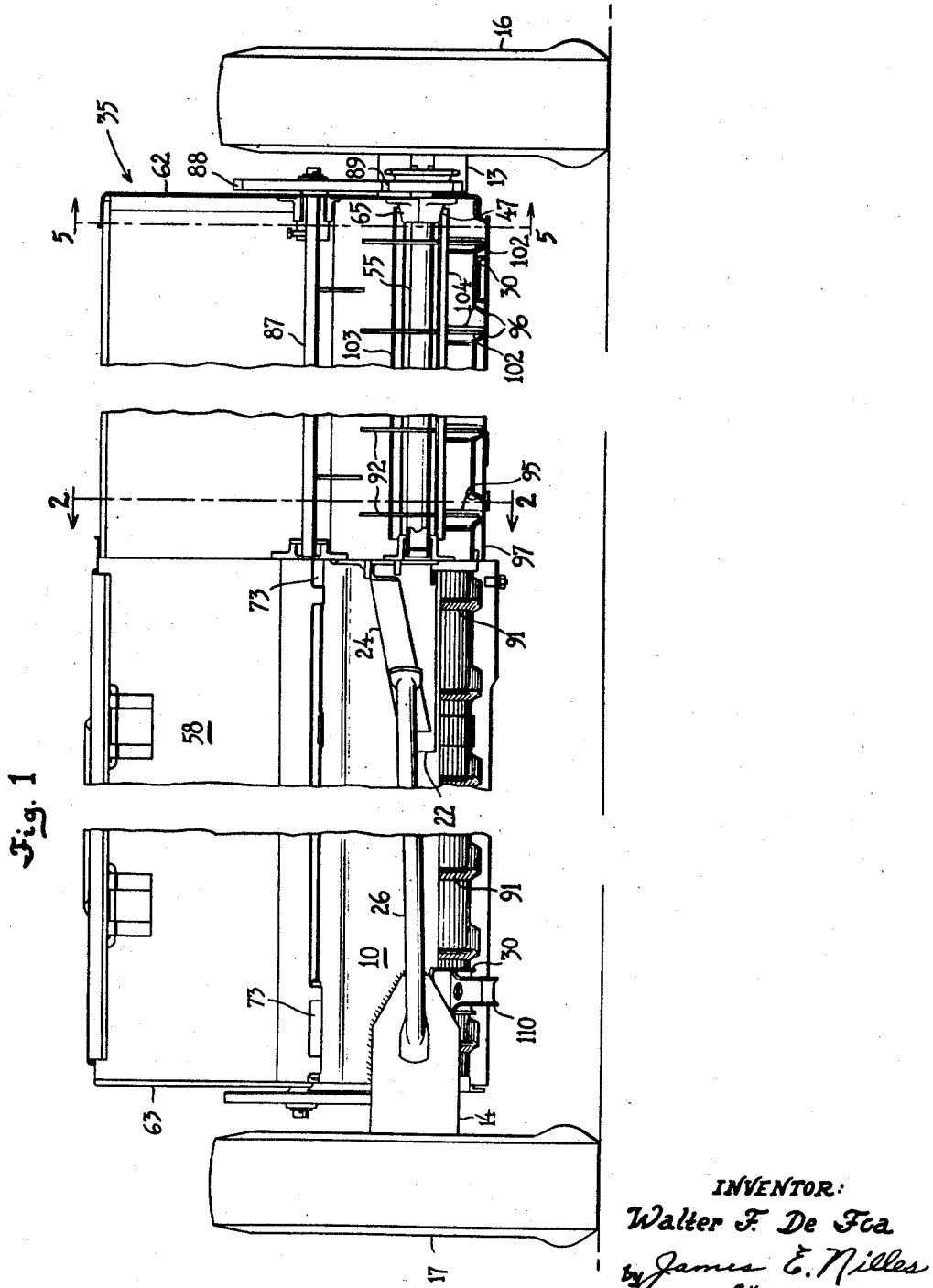

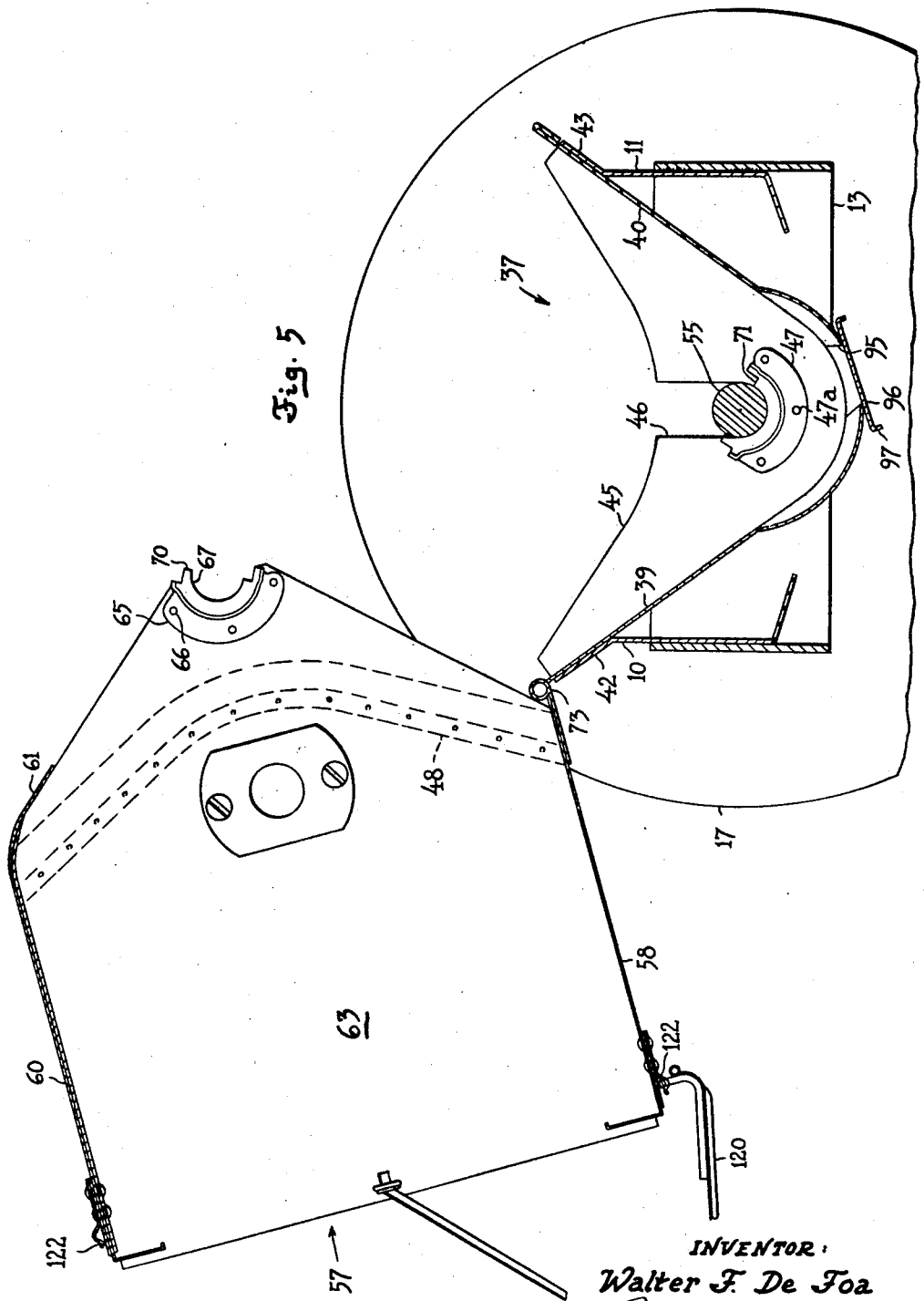

United States Patent Office 2,851,200
Patented Sept. 9, 1958

2,851,200

SPREADER WITH HINGED HOPPER AND REMOVABLE AGITATOR

Walter F. De Foa, Toronto, Ontario, Canada, assignor to Massey-Ferguson Inc., a corporation of Maryland Application February 20, 1956, Serial No. 566,450

5 Claims. (Cl. 222—274)

This invention relates to material spreading apparatus and more specifically to an improved hopper construction and feed mechanism therefor. The invention finds particular utility in a spreader for dispensing lime, fertilizers or other solid chemicals, grains, seeds and the like.

It is an object of this invention to provide a material spreader which is easily and quickly disassembled and all of the component parts made readily accessible for cleaning and maintenance purposes.

It is a more specific object of this invention to provide a material spreader having an elongated hopper made of two parts, the upper part of which is swingably connected with the lower part whereby the latter is readily accessible for cleaning purposes. The invention further contemplates a rotor assembly rotatably mounted in said hopper between complementary bearing halves secured to the lower and upper hopper parts whereby the assembly is freely removable when the upper hopper part is swung away from the lower part.

It is an object of the invention to provide a highly efficient feeding mechanism.

It is another object of this invention to provide an elongated hopper having a series of spaced transversely arranged discharged troughs in its bottom, through which feed discs are adapted to rotate, whereby the free flow of material through said troughs is restricted when the feed shaft is not rotating.

Other objects and advantages of this invention will become more apparent from the following detailed description and attached sheets of drawings wherein a form of the invention is illustrated.

Figure 1 is a front elevational view of a distributor in which the invention is embodied, with certain parts broken away and others in section for the sake of clarity.

Figure 2 is a sectional view taken on line 2—2 of Figure 1, on an enlarged scale, with certain parts broken away and other parts removed.

Figure 3 is a rear elevational view of the latch shown in Figure 2.

Figure 4 is a plan view of the distributor with certain parts removed or broken away.

Figure 5 is an elevational sectional view taken on line 5—5 of Figure 1, on an enlarged scale, showing the upper portion of the hopper swung to the open position.

Figure 6 is a sectional view, on an enlarged scale, taken on line 6—6 of Figure 4.

Figure 7 is an elevational view, on an enlarged scale, of the lower center bearing and Figure 8 is a view taken generally from above, of this bearing.

The distributor chosen for purposes of illustration is a broadcast spreader having its feed shaft made in two sections, the inner end of each section is journalled in a central bearing within the hopper. The outer end of each section is detachably connected with and driven from its adjacent ground wheel. As either half of the distributor is identical to the other, the description and references will be made to one-half or the other, it being understood that they are the same. Therefore similar numbers may sometimes designate similar parts.

Referring now more particularly to Figure 1 and 2 of the drawings, the supporting structure comprises a front and rear longitudinally arranged Z-shaped plate 10, 11 respectively. A left and right U-shaped bracket 13, 14 is welded to and connects the adjacent ends of the Z plates. As shown best in Figure 6 a ground wheel 16, 17 is rotatably mounted in bracket 13, 14 respectively on a hub 18 which is secured by bolts 20 to its respective bracket. Referring again to Figure 1 and 2, a short reinforcing angle iron 22 is secured along the front side of plate 10 and has secured thereto and extending forwardly therefrom the angle iron hitch members 24. A bracing strut 26 extends from each bracket 13, 14 to its respective hitch member 24. The forward ends of members 24 are adapted to be attached to a tractive vehicle in the conventional manner. On the underside of the framework and at spaced intervals are located inverted channel shaped hangers 30 which are welded at their front ends at 31 to the lower flange 32 of front plate 10. Hangers 30 are similarly welded at their rear ends to the lower flange 33 of rear plate 11.

The material hopper proper 35 is comprised of a bottom trough 37 which is secured to hangers 30 at its lowermost portion, as by spotwelding. The upper outwardly extending flanges or walls 39, 40 of the bottom trough are welded to the upper flange 42, 43 respectively of plates 10, 11. At each end of the bottom trough 37 is secured an end wall 45 (Fig. 5) having a slot 46 which is open at the top. Secured by rivets 47a to end wall 45 at the bottom of slot 46 is a lower end bearing 47. The upper surface of bearing 47 is of semi-cylindrical shape so as to receive the agitator shaft 55. Located centrally of the length and within the trough 37 is a lower bearing support 48 (Figures 2, 7 and 8) which is secured by bolt means 50, 51 to the walls 39, 40, respectively. This lower central bearing support 48 in practice takes the form of a casting and is of sufficient width so as to rotatably support the inner ends of each of the two sections 55 of the feed shaft.

The material hopper is also comprised of an upper material holding hopper portion 57 having a front wall 58 with an inwardly turned lower flange 59 which in the closed position rests on top of flange 39 of the trough. A rear wall 60 has an inwardly turned lower flange 61 which is adapted to bear against the top side of flange 40 of the trough in material holding relationship. An end wall 62, 63 is welded to the ends of walls 58, 60 and, as seen best in Figure 5, have an upper end bearing 65 secured by rivets 66 to its lower end. Bearing 65 is complementary to lower end bearings 47 and has a semi-cylindrical curved surface 67 which is adapted to bear against the upper surface of feed shaft 55 when in the closed position. Thus an upper end bearing 65 is provided at either end of the upper hopper portion 57 which hold the outer ends of the shaft sections 55 firmly in place in the operative position. A projection 70 on bearing 65 mates with a recess 71 in bearing 47 so as to insure that the bearings do not bind shaft 55 too tightly so as to prevent free rotation thereof. The upper hopper portion 57 extends entirely across the entire length of the spreader and is made as one piece and is hinged at 73 along its front side to the lower trough. Thus the entire upper hopper can be swung forwardly on its hinges 73 as shown in Figure 5. A central vertical partition 75 (Fig. 2) is secured within upper portion 57 by means of its flanges 76 which are spotwelded to walls 58, 60. An upper center bearing 77 is riveted to the lower end of center partition 75 and is complementary to the lower center bearing 48 and cooperates therewith, in the operating position, to hold the inner ends of shaft section 55 firmly in position. Therefore, the bottom trough has three lower bearings which are complementary to three upper bearings carried by the upper hopper. When the upper hopper is swung to the position shown in Figure 5 the feed shaft sections 55 are free to be lifted from the trough. In operating position the upper hopper is held securely in material holding position by means of latches 79 secured thereto by rivets 80 and engaging hooks 81 on the plate 11. The overcenter levers 82 force the complementary bearing halves in holding relationship around the shafts 55. On each end wall 63 a drip edge 84 (Figs. 5 and 6) is spotwelded which overhangs the upper edge of the trough ends 45. A drip edge 85 (Fig. 2) is also provided along the entire rear side of the upper hopper portion which overlaps the upper edge of trough wall 40.

An agitator shaft 87 (Fig. 1) is rotatably mounted within the upper hopper portion in suitable bearings in the end walls 62, 63 and center partition 75. This agitator is immaterial for purposes of this disclosure and it is suffice to say it is driven through gear 88 which receives its power in turn from the gear 89 secured to shaft 55.

The bottom trough 37 is so constructed so as to provide a particularly efficient feeding arrangement in cooperation with the feed shaft assembly. A series of longitudinally spaced, transversely arranged discharge troughs 91 are pressed into the bottom curved surface of the hopper trough. These discharge troughs 91 extend around the bottom of the hopper trough and are of such length so as to nearly form a semi-circle. As shown in Figures 1 and 4, these discharge troughs are rather narrow in width but accommodate the feed members 92 which rotate therein and which are rigidly secured to the feed shaft 55. More specifically, feed members 92 which take the form of discs, have a plurality of teeth 93 which penetrate into these troughs 91 and force the material therethrough and into the discharge ports 95 for passage through the hopper bottom. Discharge ports 95 are cut into the bottom of the hopper and are offset, as shown in Figures 2 and 5, about 20 degrees from the bottom. By offsetting these ports, in the direction of disc rotation, the pressure of material on the rear side of the hopper, caused by the rotating discs, is relieved. Furthermore, this offset relationship eliminates the "dead area" in the box which otherwise would not be swept clean during the final emptying stages. In other words, material does not build up in this area but, rather, the box can be emptied completely. The discharge ports 95 are formed by extrusion and the edges 96 of the extruded holes are the only surface of the trough that comes in contact with the shutter plate 97. Thus shutter friction has been substantially reduced. As shown in Figure 4, the discharge ports 95 are rectangular in shape and are so located relative to the discharge troughs 91 that one edge 98 terminates in the trough 91. It will also be noted that the small end 99 of the discharge opening 100 in the shutter registers with its respective port 95 first when moved from a "closed" to "open" position, or, from left to right as viewed in Figure 4. When very light and accurate applications of fertilizers, etc., are required, only portion 99 of the shutter registers with the port 95 and approaches it from the edge 98. In conventional spreaders of which I am aware, an uncontrollable "free flow" of material usually developed in such a situation when the feed discs were not rotating. This undesirable flow not only was wasteful but damaged the crop by "burning" it. By locating a trough adjacent the edge of the discharge port and by locating a feed disc within the relatively narrow trough, this "free flow" has been considerably retarded. More particularly, the area 102 (Fig. 1) is substantially blocked by the disc and material is prevented from running out that side of the disc. The other side of the port 95 is closed by the shutter, during light applications and "free flow" cannot occur there. A pair of bars 103, 104 are welded to discs 92 and are circumferentially spaced apart 180 degrees. These bars are coextensive in length with their shaft 55 and, as seen in Figure 2, are rectangular in cross section. These bars act to sweep through approximately 110 degrees of the hopper bottom thus assuring the material in the bottom is kept agitated and the bottom eventually swept clean. When the disc is in motion, material is forced through its respective trough and port by the teeth 93. As a result a very accurate and efficient metering operation is accomplished, especially at the lower rates of application.

Retaining clips 105 (Fig. 2) are rigidly secured by rivets 106 to the hangers 30 and have a hook portion 107 which affords a small area of contact with the shutter plate 97. Similar clips 110 are provided on the other side of the shutter but they are each detachably secured to their respective hangers 30 by a single bolt means 112. Thus by simply loosening bolts 112, the clips 110 may be swung free of the shutter and the latter lowered and removed for cleaning purposes. A conventional means has been provided for shifting the shutter and takes the form of a bell crank 114 pivoted on a post 115 which in turn is secured to a hanger 30. Crank 114 is pivotally attached at 116 to arm 117 which in turn is secured to the shutter. Crank 114 is oscillated by a connection (not shown) in the conventional manner.

The cover 120 is held in place at either side by spring clips 122 secured at spaced intervals along the front and rear top sides of the hopper. The clips 122 act also as hinges and enable the cover to be opened from either side to facilitate loading of the hopper.

It will be appreciated that there has been provided an efficient distributor in which the feed shaft assembly is quickly and easily removed without the use of any tools and by simply swinging the upper portion of the hopper about its hinge. The entire box is open and accessible, and the discharge ports fully exposed for thorough cleaning.

What is desired to be secured by Letters Patent is:

1. A material holding hopper for a spreader comprising: a bottom trough having longitudinally spaced discharge openings therein, an upper hopper portion hingedly secured along one of its sides to said trough and adapted to be detachably secured in material holding relationship therewith or swung upwardly from said trough, longitudinally spaced lower shaft bearings secured to said trough and adapted to rotatably support a feed shaft, longitudinally spaced upper shaft bearings secured to said upper portion and engageable with said shaft to hold it in operating position in said lower bearings when said upper portion is in material holding position, said shaft being freely removable from said lower bearings when said upper portion and its associated upper bearings are swung away from said trough.

2. A material spreader having an elongated hopper comprising, a bottom trough having discharge openings therein, an upper hopper portion hingedly secured along one of its sides to said trough and adapted to be detachably secured in material holding relationship therewith or swung upwardly from said trough, longitudinally spaced lower shaft bearings secured to said trough, an agitator shaft rotatably mounted in said lower bearings above said openings, longitudinally spaced upper shaft bearings secured to said upper portion and engageable with said shaft to hold it in operating position in said lower bearings when said upper portion is in material holding position, said shaft being freely removable from said lower bearings when said upper portion and its associated upper bearings are swung away from said trough.

3. A material spreader having an elongated hopper comprising, a bottom trough having discharge openings therein, an upper hopper portion hingedly secured along one of its sides to said trough and adapted to be detachably secured in material holding relationship therewith or swung upwardly from said trough, longitudinally spaced lower shaft bearings secured to said trough, an agitator shaft rotatably mounted in said lower bearings and having a series of feed members secured thereto above said openings, longitudinally spaced upper shaft bearings secured to said upper portion and engageable with said shaft to hold it in operating position in said lower bearings when said upper portion is in material holding position, said shaft being freely removable from said lower bearings when said upper portion and its associated upper bearings are swung away from said trough.

4. A device as defined in claim 3 further characterized in that said trough has a plurality of longitudinally spaced and transversely arranged discharge troughs, at least a portion of said discharge openings being located in their respective discharge troughs, said feed members rotatable within their respective discharge troughs.

5. A material spreader comprising; an elongated hopper having a curved bottom and having a plurality of longitudinally spaced and transversely positioned narrow discharge troughs in said bottom, said hopper also having discharge openings in said bottom, said discharge openings terminating in their respective discharge troughs, a feed shaft rotatably mounted in said hopper and having a plurality of feed discs which are adapted to rotate within said discharge troughs and prevent material from flowing through said openings on at least one side of said discs when said shaft is not rotating.

References Cited in the file of this patent

UNITED STATES PATENTS

| | | |
|---|---|---|
| 2,645,384 | Juzwiak et al. | July 14, 1953 |
| 2,684,185 | Mylor | July 20, 1954 |